United States Patent
LaGrange et al.

(10) Patent No.: US 10,267,366 B2
(45) Date of Patent: Apr. 23, 2019

(54) UNIVERSAL JOINT FOR DOWNHOLE MOTOR DRIVE

(71) Applicants: Timothy Edward LaGrange, Red Deer County (CA); Paul Donald Roberts, Spring, TX (US)

(72) Inventors: Timothy Edward LaGrange, Red Deer County (CA); Paul Donald Roberts, Spring, TX (US)

(73) Assignee: TRUE NORTH TECHNOLOGIES, LLC, Spring, TX (US)

( * ) Notice: Subject to any disclaimer, the term of this patent is extended or adjusted under 35 U.S.C. 154(b) by 323 days.

(21) Appl. No.: 15/330,338

(22) Filed: Sep. 7, 2016

(65) Prior Publication Data

US 2017/0082152 A1 Mar. 23, 2017

Related U.S. Application Data

(60) Provisional application No. 62/284,199, filed on Sep. 22, 2015.

(51) Int. Cl.
*F16D 3/226* (2006.01)
*E21B 7/06* (2006.01)
*E21B 17/02* (2006.01)
*F16D 3/223* (2011.01)

(52) U.S. Cl.
CPC ............ *F16D 3/2265* (2013.01); *E21B 7/067* (2013.01); *F16D 2003/22309* (2013.01); *Y10S 464/906* (2013.01); *Y10T 29/49826* (2015.01)

(58) Field of Classification Search
CPC .......... E21B 7/067; E21B 17/02; E21B 17/04; F16D 3/221; F16D 3/223; F16D 3/226; F16D 3/2265; F16D 2003/22309; Y10S 464/906; Y10T 29/49826
USPC ................. 464/139, 141, 143, 906; 29/428
See application file for complete search history.

(56) References Cited

U.S. PATENT DOCUMENTS

| | | | | |
|---|---|---|---|---|
| 3,362,192 | A | * 1/1968 | Orain | F16D 3/223 464/143 |
| 4,068,499 | A | * 1/1978 | Sharp | B60K 17/165 464/113 |
| 4,772,246 | A | | 9/1988 | Wenzel |
| 5,000,723 | A | | 3/1991 | Livingstone |

(Continued)

*Primary Examiner* — Josh Skroupa

(57) ABSTRACT

A constant velocity universal joint is assembled as a crown ball meshed within a housing socket for rotation about respective rotational axes. The outside diameter of the crown ball is greater than the inside diameter of the socket. A plurality of channels, equally spaced around the crown ball perimeter are cut into the crown ball surface generally along or parallel with the crown ball drive axis. An arcuate cup is cut into each crown ball channel to confine a respective torque transfer element. A number, corresponding to the number of crown ball channels, of partial cylinder channels are cut into the inside surface of the housing socket. One of opposite side walls for each housing channel is given an arcuate radius corresponding to that of the force transfer elements. Ridges between adjacent crown ball channels mesh with ridges between adjacent housing socket channels. Torque transfer elements confined within said crown ball cups engage the partial cylinder wall of the housing channels to transfer drive forces between the crown ball and socket housing through a departure angle between the respective rotational axes.

37 Claims, 6 Drawing Sheets

(56) References Cited

U.S. PATENT DOCUMENTS

| | | | |
|---|---|---|---|
| 5,007,491 A | 4/1991 | Ide | |
| 5,052,501 A | 10/1991 | Wenzel et al. | |
| 5,267,905 A | 12/1993 | Wenzel et al. | |
| 5,547,032 A | 8/1996 | Wenzel | |
| 5,704,838 A | 1/1998 | Teale | |
| 5,954,587 A | 9/1999 | Jacob | |
| 6,042,479 A | 3/2000 | Hopson et al. | |
| 6,949,025 B1 | 9/2005 | Kraus | |
| 7,153,213 B2 * | 12/2006 | Sone | F16D 3/2233 464/906 |
| 7,624,819 B1 * | 12/2009 | LeBlanc | F16D 3/221 464/139 |
| 8,033,920 B1 | 10/2011 | Benson | |
| 8,062,140 B2 * | 11/2011 | Wall | E21B 17/03 175/107 |
| 8,215,841 B2 | 7/2012 | Wenzel | |
| 8,246,476 B2 * | 8/2012 | Chen | F16D 3/221 464/141 |
| 8,251,828 B2 * | 8/2012 | Kozlowski | F16D 3/221 464/141 |
| 8,323,116 B2 * | 12/2012 | Flores-Garay | F16D 3/221 464/141 |
| 8,894,497 B2 | 11/2014 | Kim | |
| 8,915,788 B2 | 12/2014 | Foote et al. | |
| 9,382,950 B2 * | 7/2016 | Pheasey | F16D 3/221 |
| 9,822,823 B2 * | 11/2017 | Wingerter | F16D 3/221 |
| 10,041,299 B2 * | 8/2018 | von Gynz-Rekowski | F16D 3/221 |

* cited by examiner

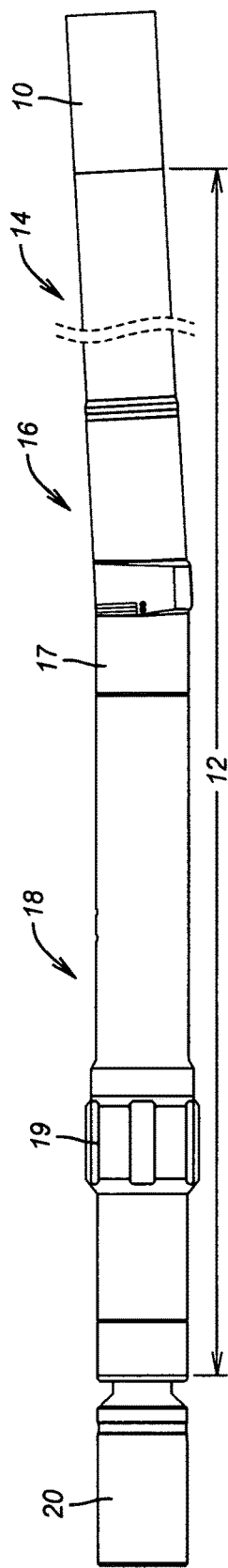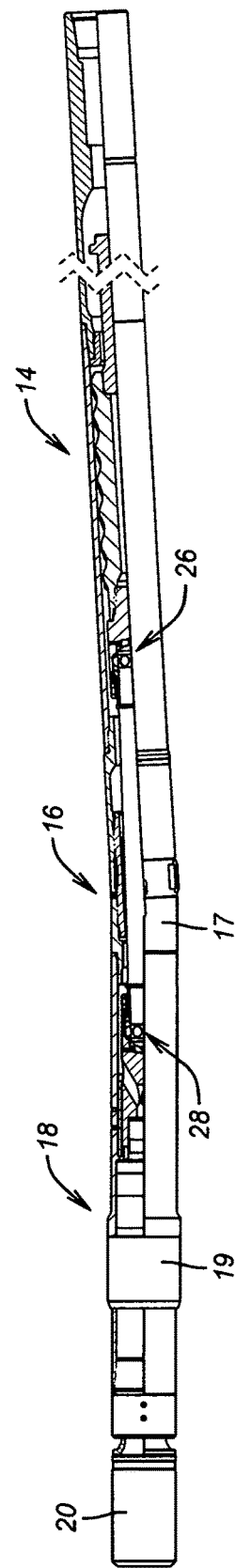

UNIVERSAL JOINT FOR DOWNHOLE MOTOR DRIVE

CROSS-REFERENCE TO RELATED APPLICATION

Applicants claim the priority benefit of Provisional Application No. 62/284,199 filed Sep. 22, 2015.

BACKGROUND OF THE INVENTION

Field of the Invention

This invention relates to earthboring, in general, and specifically to constant velocity universal joints. Universal joints have general utility in the realm of power transmission as a mechanism for redirecting an axial line of rotary torque. The present invention has particular value to the industrial art of directional well drilling.

Discussion of Prior Art

One procedure for directional drilling of boreholes in the earth includes a downhole drilling motor (also called a mud motor) for rotatively driving the drill bit. Drilling motors are modern adaptions of the ancient Archimedes screw used for lifting or pumping water but is operated in reverse. To drill directionally, drilling fluid essential for rotary drilling is pumped down the central bore of a pipe string. Just prior to reaching the drill bit, the drilling fluid is directed through the drilling motor. At the uphole end of the drilling motor the Archimedes screw is used to convert fluid energy into rotating mechanical energy. The drilling fluid acts against a helically lobed shaft, known as a rotor, which rotates about its axis within a correspondingly lobed housing known as a stator. The stator along with the drill string above and drilling motor outer housings below remain stationary. Only the rotor, output drive shaft and drill bit rotate when drilling in this mode.

To directionally drill or generate arced curvature of the wellbore, the rotary drive axis of the drill bit must be deviated from the uphole axis of the drilling motor. The traditional means for changing the angular direction of the motor output drive shaft is with a mechanism characterized as a universal joint. All universal joints must transmit both compressive and torque load from the rotor/stator power section to the bearing assembly. One of the most popular universal joint mechanisms favored by the earthboring industry is that described as a "constant velocity" or CV joint.

Generally, CV joints comprise mirrored upper and lower ball and socket housing arrangements. To accommodate axial compression loads, most employ some method of spherical ball bearing or semi-spherical ball shape secured to the end of a drive shaft which fits within a socket housing having a mating, semi-spherical pocket.

To transmit torque loads, the CV joint ball and socket housing are mechanically linked by a plurality of torque transfer balls. The drive shaft ball, hereafter characterized as the "ball", typically confines the torque transfer balls within mating cups. The cups are angularly spaced equally about the ball perimeter in the diametric plane transverse to the in-drive axis. The cup diameters are substantially the same as the torque transfer balls but less than half the hemisphere depth.

The socket housing pocket, hereafter characterized as the housing "socket", typically contains a plurality of race channels parallel with the socket out-drive axis distributed about the internal surface of the pocket. The number of race channels must exactly match the circumferential location of the mating driveshaft ball cups and are angularly spaced equally about the pocket perimeter. The channel depth is less than a hemisphere of each ball.

As the in-drive and out-drive shafts rotate, torque transfer balls shift along the socket channels from one side of a transverse diameter plane to the other. The torque force is transferred through the torque transfer balls from the socket surface area to an axially moving arced line across a respective channel. Consequently, most of the mechanical wear on the joint occurs to the socket channels in the area of the shifting ball contact line.

BRIEF DESCRIPTION OF THE DRAWINGS

The advantages and further features of the invention will be readily appreciated by those of ordinary skill in the art as the same becomes better understood by reference to the following detailed description when considered in conjunction with the accompanying drawings in which like reference characters designate like or similar elements throughout.

FIG. 1 is an elevation view of a directional drilling motor assembly.

FIG. 2 is an expanded, sectioned view of a drilling motor assembly

DESCRIPTION OF THE PREFERRED EMBODIMENTS

Figure 3:
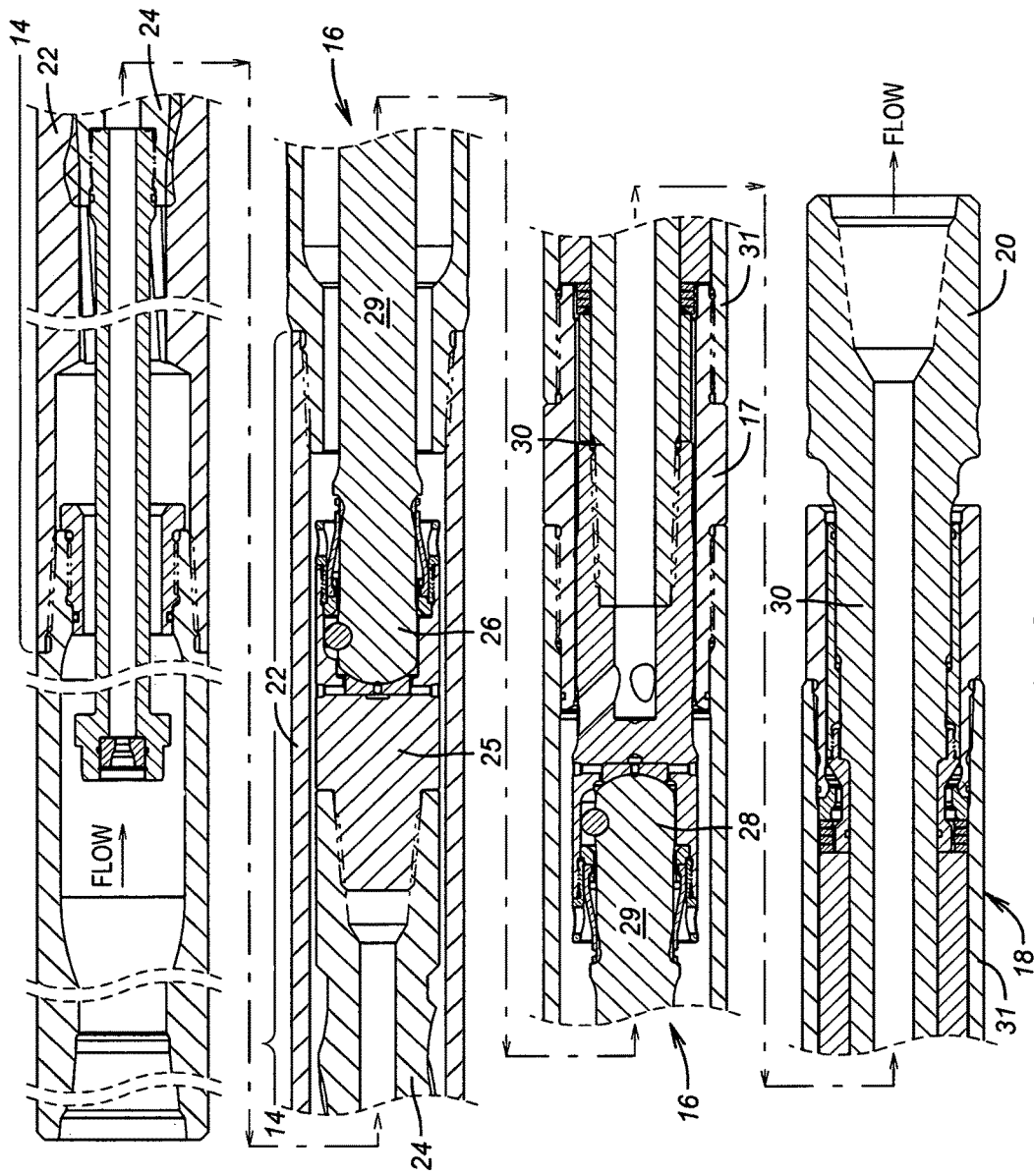
FIG. 3 is an enlarged and segmented view of the FIG. 2 section.
Figure 5:
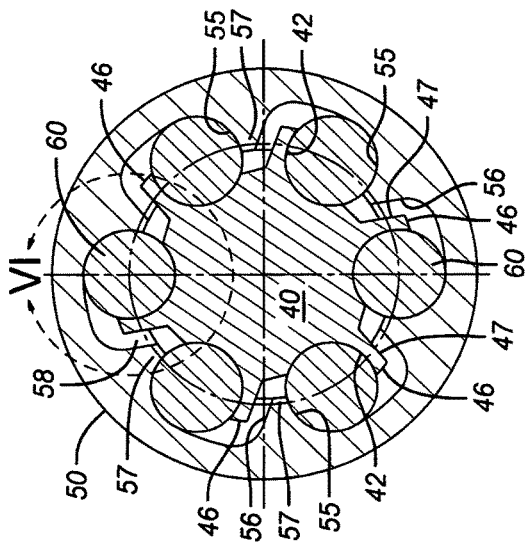
FIG. 5 is a transverse cross section of the first invention embodiment as viewed along cutting plane V-V of FIG. 4.

As used herein, the terms "up" and "down", "upper" and "lower", "upwardly" and "downwardly", "upstream" and "downstream"; "above" and "below"; and other like terms indicating relative positions above or below a given point or element are used in this description to more clearly describe some embodiments of the invention. However, when applied to equipment and methods for use in wells that are deviated or horizontal, such terms may refer to a left to right, right to left, or other relationship as appropriate. Moreover, in the specification and appended claims, the terms "pipe", "tube", "tubular", "casing", "liner" and/or "other tubular goods" are to be interpreted and defined generically to mean any and all of such elements without limitation of industry usage.

The term "sub", as used herein, is a drilling industry term of art for describing a segment of drill string usually having a length less than a full pipe joint and formed or constructed to perform a specific task in the drilling or well completion process.

FIG. 1 provides an overall representation of the invention operating environment. The lower distal end of a deviated direction drill string traditionally comprises one or more drill collars 10 which are, approximately, 30 ft. lengths of pipe having an exceptionally thick annulus section. The drill collars 10 provide the end-biased weight upon the cutting bit at the distal end of the drill string. Theoretically, that portion of the drill string above the collars is under tensile stress.

Below the collars is a directional drilling motor 12 driven by a flow of circulating drilling fluid. Referring to FIG. 2, a directional drilling motor broadly comprises a power section 14, a transmission assembly 16, a bearing assembly 18 and a bit box 20. Within the transmission assembly 16, between the power section 14 and the bearing assembly 18 is a bent housing assembly 17. Below the bent housing assembly 17 is a wear collar or stabilizer 19.

With respect to FIG. 3, the power section 14 comprises a housing 22 and internal rotor 24. The housing 22 has an axially developed internal bore profile that corresponds with the external helical profile of the internal rotor shaft 24. Drilling fluid pumped through the housing bore between the housing and rotor shaft profiles drives rotation of the rotor shaft 24 about its axis of revolution. As the rotor shaft 24 rotates about its axis, the rotor axis also orbits about the central axis of the housing 22.

The downhole end of the rotor shaft 24 is secured to the housing sub 25 of an uphole CV joint 26. The uphole CV joint 26 transfers rotation of rotor shaft 24 to the transmission shaft 29 as it accommodates the orbit of the rotor shaft 24. The downhole end of the transmission shaft 29 rotatively drives a second CV joint 28, substantially identical to CV joint 26, which transfers shaft 29 rotation to the bearing shaft 30. The rotational axis of the bearing shaft 30 is determined by the bent housing 17 which may redirect the drive axis from the motor rotor shaft 24 axis by small angles up to about 3°, for example. Accordingly, both CV joints 26 and 28 accommodate an angular departure of an output rotational axis relative to the input rotational axis.

The bearing assembly 18 includes a bearing housing 31 and bearing shaft 30 for transfer of drilling torque and weight to the bit box 20. The bearing shaft 30 delivers rotating torque to a drill bit (not shown) secured in the bit box 20 and accommodates the consequential drilling shock.

The housing 31 secures radial alignment for the bearing shaft 30 and transfers the collar drilling weight to the bit.

Figure 4:
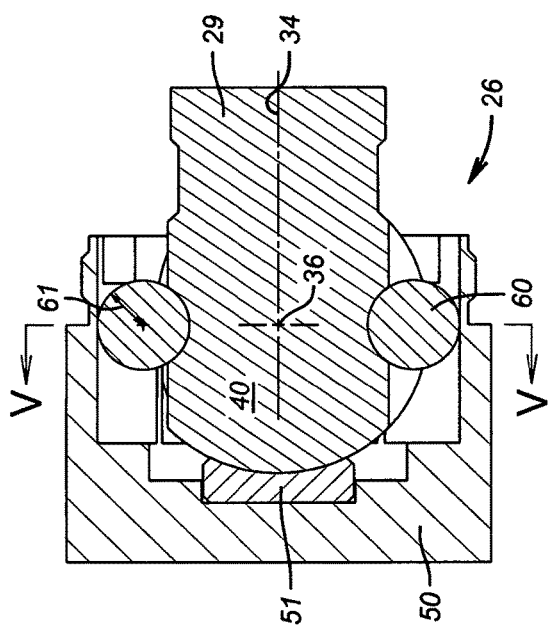
FIG. 4 is an axial cross section of a first embodiment of the invention CV joint.
Figure 7:
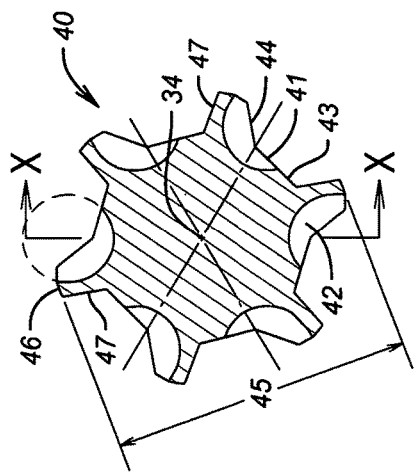
FIG. 7 is a pictorial view of the first embodiment ball element.
Figure 8:
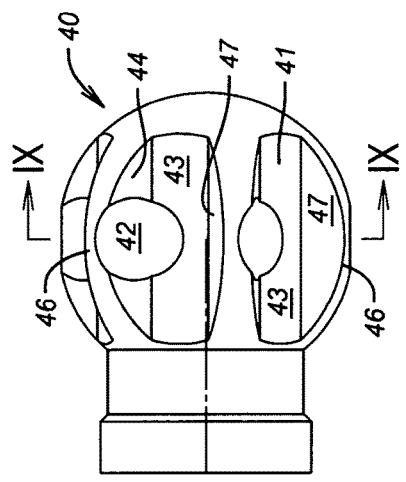
FIG. 8 is an elevation view of the first embodiment ball element.
Figure 10:
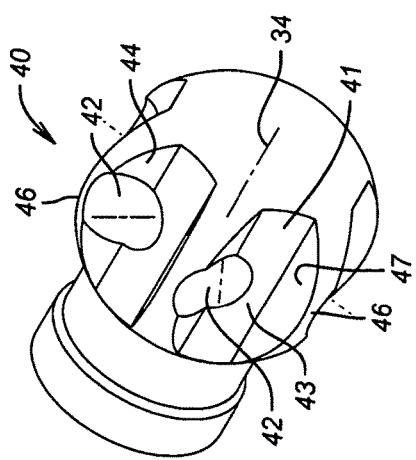
FIG. 10 is a cross section of the first embodiment ball element viewed along cutting plane X-X of FIG. 9.
Figure 9:
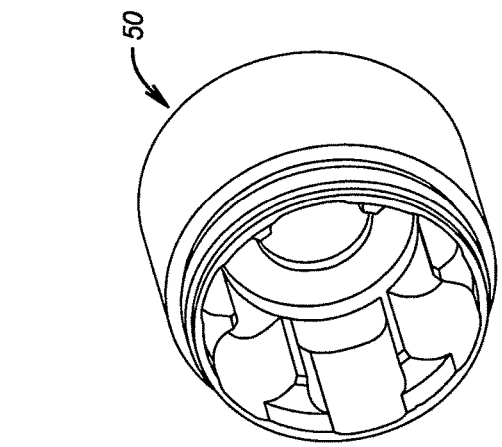
FIG. 9 is a cross section of the first embodiment ball element as viewed along cutting plane IX-IX of FIG. 8.

With respect to FIG. 4, the CV joint 26 of the present invention broadly comprises a crown ball 40 and socket housing 50. The crown ball 40 has a substantially spherical surface secured to the distal end of a transmission shaft 29. The crown ball 40 may be an integrally forged portion of the transmission shaft 29. A plurality, usually four to eight, of arced force transfer elements such as balls 60 mechanically link the crown ball 40 to the socket housing 50. A thrust seat 51 transfers the axial thrust of the drilling fluid static and dynamic loads from the drilling motor rotor shaft 24 to the crown ball 40.

The crown ball 40, shown by FIGS. 7 through 10, is a partial sphere about a center point 36 that is intersected by the crown ball axis 34. Normally, the crown ball axis 34 is coincident with the drive axis of transmission shaft 29. A number of chord traversing channels 41 are cut into the spherical surface of crown ball 40. In this example, the selected number of chord traversing channels 41 is six; each aligned in substantial parallelism with the axis 34 and distributed about the axis 34 in equal increments of 60°. With respect to FIG. 7 and for the purpose of descriptive nomenclature, each channel 41 comprises a channel bottom 43, a loaded side wall 44 and a back wall 47. Between each loaded side wall 44 and adjacent channel back wall 47 is a ridge 46. It is also appropriate to explain that the term "chord", as used and intended herein, is not necessarily a linear or straight line segment between two points on the surface of a sphere. A preferred embodiment of the invention aligns the channels bottoms 43 substantially parallel with the crown ball axis 34 and consequently, parallel with the torque axis of transmission shaft 29. However, the channels 41 may also be skewed with respect to the crown ball axis 34 or even arced following a substantially constant radius from the axis 34. The term "chord" is used to encompass all appropriate channel configurations.

Figure 6:
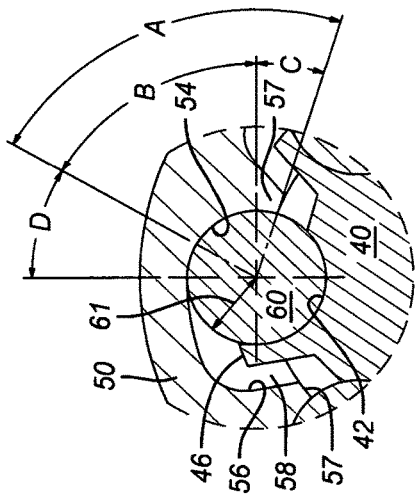
FIG. 6 is an enlarged detail of the FIG. 5 portion circumscribed as VI.
Figure 11:
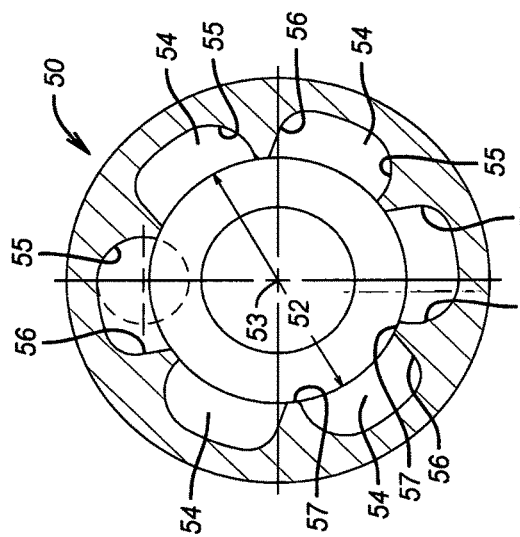
FIG. 11 is a cross section of the invention housing.

Centered in the transverse center plane (FIG. 8 cutting plane IX-IX) of each crown ball 40 is an arced cup or pocket 42 cut into the bottom 43 and loaded side wall 44 of each channel 41. The depressions of the cups 42 are cut to an arced inside radius corresponding to the outside radius 61 of force transfer elements 60 (FIGS. 4 and 6). The outside diameter 45 (FIG. 9) of the crown ball 40 as measured between diametrically opposite channel ridge crests 46, is greater than the inside diameter 52 of the socket housing 50 as shown by FIG. 11. The crown ball ridge crest radius about axis 34 coincides with the outside diameter 45. This important relationship will be further developed with respect to FIG. 6.

Figure 12:
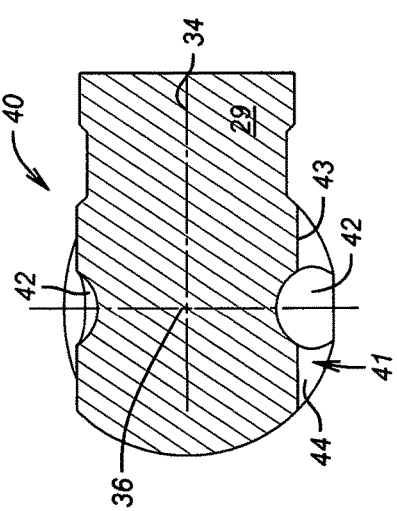
FIG. 12 is a pictorial view of the invention housing.
Figure 14:
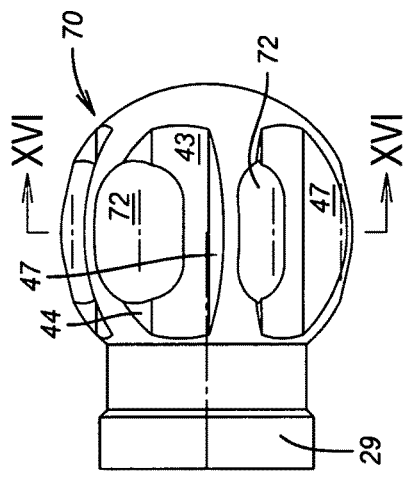
FIG. 14 is a pictorial view of the second embodiment ball element.
Figure 15:
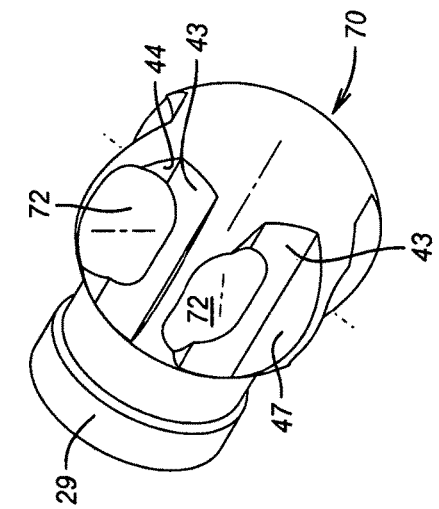
FIG. 15 is an elevation view of the second embodiment ball element
Figure 17:
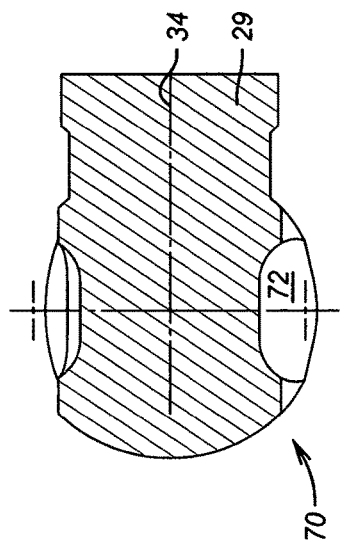
FIG. 17 is a section view of the second embodiment viewed along cutting plane XVII-XVII of FIG. 16.
Figure 13:
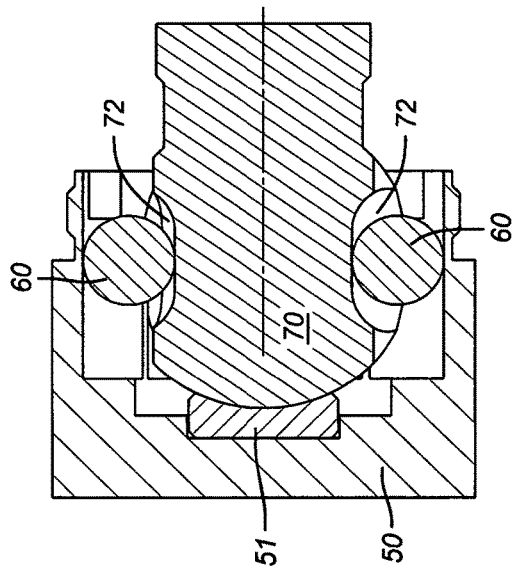
FIG. 13 is an assembly cross section of a second embodiment of the invention.

Referring to FIGS. 11 and 12, the joint socket housing 50 comprises a major inside cylindrical boring ID 52 about the housing axis 53. Into the inside surface of the cylindrical boring, six partial-cylinder channels 54 are cut to an axial depth, parallel with the housing axis 53, sufficient to accommodate the crown ball 40 OD. These partial cylinder channels 54 are formed to substantially the same inside arc radius as the outside arc radius 61 of the force transfer elements 60. Those of ordinary skill will understand that there is a dimensional tolerance difference between the outside arc radius 61 of the force transfer elements 60 and the inside arc radius of the cups 42 (and cylinder channels 54). The reference to the outside arc radius 61 of the force transfer elements 60 as being the inside arc radius of the cups 42 and cylinder channels 54 is a literary convenience. Usually, the two radii are not identical but differ dimensionally by a slight degree.

As a partial cylinder, each channel 54 has two opposing walls. One wall 55 of the radius 61 is the loading wall opposite from the cup 42. The back wall 56, diametrically opposite from the loading wall 55, is a tangential expansion of the channel 54 for crown ball ridge 46 relief space 58. Housing structure between the loading wall 55 and the back wall 56 forms a socket ridge 57.

From the foregoing general assembly description, it will be understood that dimensions are coordinated to maximize the loading area of the arced cup 42 against the force transfer elements 60. Similarly, the compressive line contact of the crown ball 40 against the cylindrical channel 54 is also increased. The detail of FIG. 6 illustrates a single force transfer element 60 and the approximate directions of load distribution as torque from the crown ball 40 to the socket housing 50. By countless wear tests and measurements, it has been found that prior art CV joints transfer torque load by line contact between the force transfer elements and the socket housing channels by about 60° as represented by arc "B" of FIG. 6. Although there is contact between the force transfer elements 60 and the cylinder loading wall 54 as represented by arc D, the load transferred over this arc is insignificant.

Comparatively, applicants' invention has an effective load transfer from the force transfer elements 60 to the housing channel loading walls 54 over an arc "A" of about 75° for an effective load arc increase of about 15°, or approximately 20%, as represented by arc "C". Such an increase in the load transfer arc has resulted in a synergistic increase in operational life of the CV joint.

The meshed assembly of the crown ball ridge crests 46 into the socket housing relief space 58 allows a transfer vector between the crown ball 40 and the socket housing 50 that is more normal to the axes 34 and 53 of respective components. As a corollary to the foregoing result, the magnitude of an ineffective radial force vector (arc D) is reduced. Additionally, a greater load arc (arc A) between the crown ball 60 and loading wall 54 is made available for greater operating life.

Figure 16:
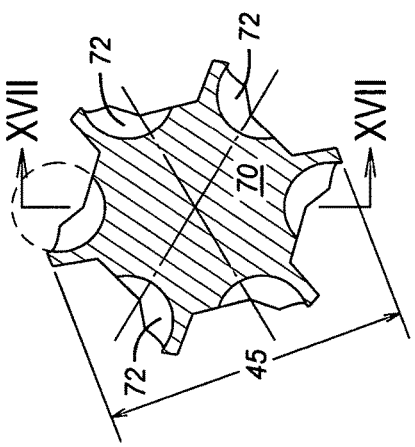
FIG. 16 is a section view of the second embodiment viewed along cutting plane XVI-XVI of FIG. 15
Figure 18:
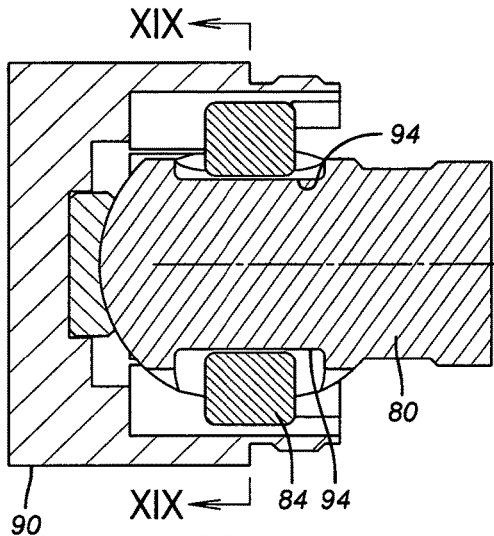
FIG. 18 is an axial cross-section of a third embodiment of the invention
Figure 19:
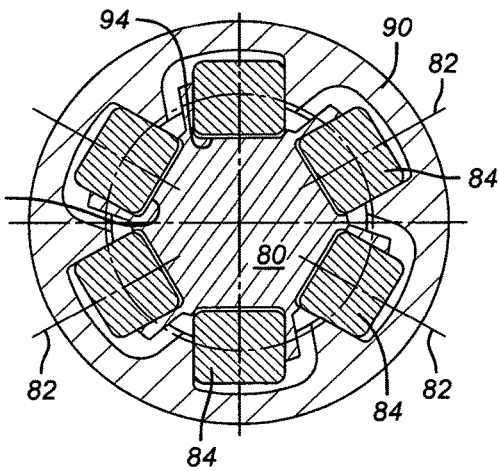
FIG. 19 is a transverse cross-section of the FIG. 18 invention embodiment shown along cutting plane XIX of FIG. 18.
Figure 20:
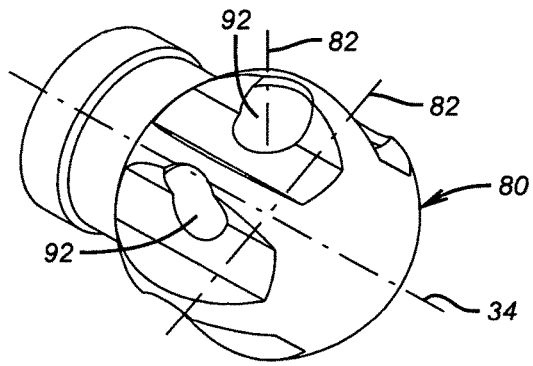
FIG. 20 is a pictorial view of a crown ball for the third invention embodiment.

An alternative embodiment of the invention is represented by FIGS. 13 through 17. This alternative embodiment differs from the previous FIG. 7 embodiment mainly in the provision of a trough 72 cut into the juncture between the loaded wall 44 and the channel bottom 43. As shown by FIG. 16, the trough profile is substantially cylindrical with a radius corresponding to that of the force transfer elements 60. The trough 72 length should be sufficient to accommodate rolling displacement of the torque transfer ball as the crown ball 70 completes rotation about its axis 34.

Figure 21:
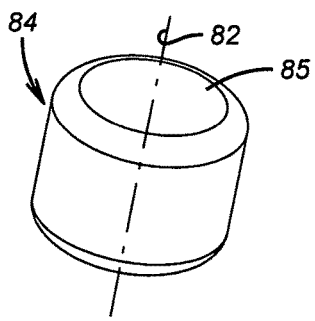
FIG. 21 is a pictorial view of a cylindrical force transfer element for the third invention embodiment.

Another embodiment of the invention is represented by FIGS. 18 through 23. In a first configuration of this third embodiment, the force transfer elements are rollers 84 as shown by FIG. 21 having circular surface formed about the axis 82 between relatively flat end-faces 85. Distinctively, the force transfer element channels 94 in the crown ball that link the socket housing 90 to the crown ball 80 have relatively flat bottoms 94 to interface with relatively flat roller end-faces 85. The rollers 84 are aligned in the crown ball channels 92 with the roller axis 82 normal to the crown ball torque axis 34.

Figure 22:
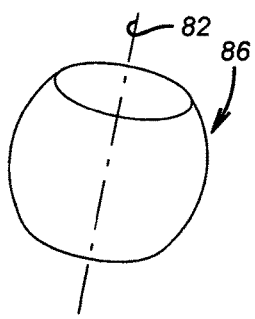
FIG. 22 is a pictorial view of a partial sphere force transfer element for the third invention embodiment.
Figure 23:
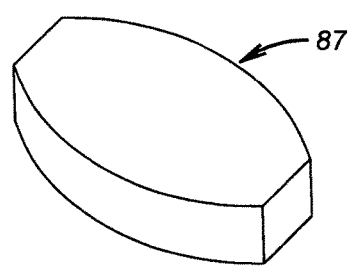
FIG. 23 is a pictorial view of a partial ellipse force transfer element for the third invention embodiment.

The third invention embodiment may also include a force transfer element in the form of a partial sphere 86 as illustrated by FIG. 22 having spherical surfaces about axis 82 between relatively flat end-faces. FIG. 23 illustrates a partially elliptical force transfer element.

The primary utility of the above described invention is envisioned to be as a drilling motor transmission joint. In that application reverse drive occasions are rare to non-existent. Consequently, the invention is normally expected to be designed for applications restricted to a single rotation direction. However, to a limited degree, the present CV joint is capable of reverse torque transmission. In such an event, a reverse rotation about the axes 34 and 53 will engage the back wall 47 of crown ball ridge 46 with the back wall 56 of housing channel 54 for transfer of torsional forces.

Although the invention disclosed herein has been described in terms of specified and presently preferred embodiments which are set forth in detail, it should be understood that this is by illustration only and that the invention is not necessarily limited thereto. Alternative embodiments and operating techniques will become apparent to those of ordinary skill in the art in view of the present disclosure. Accordingly, modification of the invention are contemplated which may be made without departing from the spirit of the claimed invention.

The invention claimed is:
1. A universal joint comprising:
   a crown ball having a crown ball drive axis and a substantially spherical surface formed about a first radius;
   a plurality of crown ball channels formed along chords in the crown ball surface substantially parallel with said crown ball drive axis, said channels distributed substantially equally about the crown ball perimeter, each channel having a first loading wall, a back wall and an arched ridge between each first loading wall and the back wall of an adjacent crown ball channel, the crest of said arched ridge conformed to said crown ball first radius;
   a depressed cup area in each first loading wall;
   a housing having a cylindrical socket therein formed about a housing axis;
   a plurality of housing channels around a perimeter of said cylindrical socket corresponding with said crown ball channels, each housing channel having a relief space between a second loading wall and a back wall;
   each housing channel having a housing ridge between each second loading wall and an adjacent channel relief space,
   said crown ball disposed within said housing socket to mesh said crown ball ridges in said housing relief space between adjacent housing ridges; and,
   arced force transfer elements seated in respective depressed areas to transfer force between said first loading walls and said second loading walls.
2. The universal joint described by claim 1 wherein said chords have a linear traverse between distal end points on said crown ball surface parallel with said crown ball drive axis.
3. The universal joint described by claim 1 wherein said chords traverse between distal end points on said crown ball surface at a skewed angle to said crown ball drive axis.
4. The universal joint described by claim 1 wherein said chords have a curved traverse between distal end points on said crown ball surface following a substantially constant radius from said crown ball drive axis.
5. The universal joint as described by claim 1 wherein said arced cups are depressed into said crown ball loading wall.
6. The universal joint described by claim 1 wherein the inside surfaces of said arced cups are arced by a radius corresponding substantially to that of said force transfer elements.

7. The universal joint described by claim 1 wherein said second loading walls are arced by a radius corresponding substantially to that of said force transfer elements.

8. The universal joint described by claim 1 wherein said arced force transfer elements comprise spheres.

9. The universal joint described by claim 1 wherein said arced force transfer elements comprise partial spheres.

10. The universal joint described by claim 1 wherein said arced force transfer elements comprise substantially cylindrical rollers.

11. The universal joint described by claim 1 wherein said arced force transfer elements comprise tapered rollers.

12. A universal joint comprising:
   a crown ball having a crown ball drive axis and a substantially spherical surface formed to a first radius about a crown ball center point;
   a plurality of crown ball channels formed along chords in the crown ball surface substantially parallel with said crown ball drive axis, said channels distributed substantially equally about the crown ball perimeter, each channel having a first loading wall, and an opposing back wall;
   an arched ridge between each first loading wall and the back wall of an adjacent crown ball channel, said arched ridge having a crest radius from said crown ball center point;
   a pocket in each first loading wall having an arcuate cross section;
   a housing having a cylindrical socket therein formed about a housing axis;
   a plurality of housing channels around a perimeter of said cylindrical socket corresponding with said crown ball channels, each housing channel having a relief space between a second loading wall and an opposing wall;
   a housing ridge formed between each second loading wall of a first channel and the opposing wall of an adjacent housing channel,
   said crown ball aligned within said housing socket to mesh each arched crown ball ridge in a housing relief space between adjacent housing ridges; and,
   arced force transfer elements seated in respective crown ball pockets to bear against said second loading walls for transfer of force between said first loading wall and said second loading wall.

13. The universal joint described by claim 12 wherein said chords have a linear traverse between distal end points on said crown ball surface parallel with said crown ball drive axis.

14. The universal joint described by claim 12 wherein said chords traverse between distal end points on said crown ball surface at a skewed angle to said crown ball drive axis.

15. The universal joint described by claim 12 wherein said chords have a curved traverse between distal end points on said crown ball surface following a substantially constant radius from said crown ball drive axis.

16. The universal joint described by claim 12 wherein said pockets in said crown ball channels are depressed into said first loading walls.

17. The universal joint described by claim 16 wherein transverse bottom surfaces of said pockets in said first loading walls are arced by a radius corresponding substantially to that of said arced force transfer elements.

18. The universal joint described by claim 12 wherein surfaces of said second loading walls are arced by a radius corresponding substantially to that of said arced force transfer elements.

19. The universal joint described by claim 12 wherein said arced force transfer elements comprise spheres.

20. The universal joint described by claim 12 wherein said arced force transfer elements comprise partial spheres.

21. The universal joint described by claim 12 wherein said arced force transfer elements comprise substantially cylindrical rollers.

22. The universal joint described by claim 12 wherein said arced force transfer elements comprise tapered rollers.

23. A method of assembling a universal joint comprising the steps of:
   providing a crown ball at a distal end of a first drive shaft, said crown ball having a rotational axis coincident with a rotational axis of said first drive shaft, spherical surface elements of said crown ball at a first radial distance from a center of said crown ball;
   forming a plurality of channels in the surface elements of said crown ball substantially paralleling said rotational axis, each channel flanked by opposing side walls comprising a first loading wall and a first back wall;
   providing a depressed area with a curved surface in said first loading wall,
   providing arced ridges of crown ball surface elements between said channels;
   providing a socket housing at the distal end of a second drive shaft, said socket housing having a rotational axis coincident with a rotational axis of said second drive shaft;
   providing a socket in said housing having a cylindrical radius about said socket housing rotational axis;
   providing a plurality of internal housing channels in surface elements of said socket, said plurality of housing channels corresponding to the plurality of crown ball channels, each housing channel flanked by opposing side walls comprising a second loading wall and a second back wall;
   providing substantially linear ridges of cylindrical surface elements between said housing channels;
   meshing crown ball ridges into said housing channels to position cylindrical surface element ridges at a smaller radial distance from said crown ball rotational axis than an arcuate crest of said crown ball ridges; and,
   positioning an arced force transfer element in said depressed areas to link a first loading wall to a respective second loading wall.

24. The method of assembling a universal joint described by claim 23 wherein said substantially parallel channels in the surface elements of said crown ball are provided an arced traverse between intersected surface elements following a substantially constant radius from said crown ball rotational axis.

25. The method of assembling a universal joint described by claim 23 wherein said substantially parallel channels in the surface elements of said crown ball are provided a linear traverse between intersected surface elements following a substantially constant radius from said crown ball rotational axis.

26. The method of assembling a universal joint described by claim 23 wherein said arced force transfer elements are spheres.

27. The method of assembling a universal joint described by claim 23 wherein said arced force transfer elements are partial sphere.

28. The method of assembling a universal joint described by claim 23 wherein said arced force transfer elements are substantially cylindrical rollers.

29. The method of assembling a universal joint described by claim 23 wherein said arced force transfer elements are tapered rollers.

30. A method of assembling a universal joint comprising the steps of:
- providing a crown ball at a distal end of a first drive shaft, said crown ball having a rotational axis coincident with a rotational axis of said first drive shaft, spherical surface elements of said crown ball at a first radial distance from a center of said crown ball;
- providing a plurality of substantially parallel first channels in said ball surface spaced uniformly around said rotational axis, each channel flanked by opposing first side walls comprising a first loading wall and a first back wall;
- providing arced ridges of crown ball surface elements between said channels;
- providing a pocket in said first loading walls;
- providing a socket housing at a distal end of a second drive shaft, said socket housing having a rotational axis coincident with a rotational axis of said second drive shaft;
- providing a cylindrical socket in said housing having an inside cylindrical radius about said socket housing rotational axis;
- providing a plurality of second channels in cylindrical surface elements of said socket, said plurality of second channels corresponding in number and spacing to said plurality of first channels, each second channel flanked by opposing second side walls comprising a second loading wall and a second back wall;
- providing substantially linear ridges of cylindrical surface elements between said second channels;
- meshing said crown ball into said cylindrical socket to penetrate said second channels by said crown ball ridges and penetrate said first channels by said linear ridges; and,
- positioning an arced force transfer element in said pocket between each of said first loading walls and respective second loading walls to transfer force between said crown ball and said socket housing.

31. The method of assembling a universal joint described by claim 30 wherein said substantially parallel first channels in the surface elements of said crown ball are provided an arced traverse between intersected surface elements and traverse along a substantially constant radius from said crown ball rotational axis.

32. The method of assembling a universal joint described by claim 30 wherein said substantially parallel channels in the surface elements of said crown ball are provided a linear traverse between intersected surface elements and traverse along a substantially constant radius from said crown ball rotational axis.

33. The method of assembling a universal joint described by claim 30 wherein cups having a substantially arcuate bottom are provided in said first channels to confine positions of said arced force transfer elements.

34. The method of assembling a universal joint described by claim 30 wherein said arced force transfer elements are spheres.

35. The method of assembling a universal joint described by claim 30 wherein said arced force transfer elements are partial spheres.

36. The method of assembling a universal joint described by claim 30 wherein said arced force transfer elements are substantially cylindrical rollers.

37. The method of assembling a universal joint described by claim 30 wherein said arced force transfer elements are tapered rollers.

* * * * *